April 16, 1968  E. E. CASTOR  3,378,269
METAL-TO-METAL SEAL DEVICES
Filed Jan. 27, 1965

INVENTOR
Edward E. Castor
BY Arnold & Roylance
ATTORNEYS

United States Patent Office 3,378,269
Patented Apr. 16, 1968

3,378,269
METAL-TO-METAL SEAL DEVICES
Edward E. Castor, Houston, Tex., assignor to Armco Steel Corporation, Middletown, Ohio, a corporation of Ohio
Filed Jan. 27, 1965, Ser. No. 428,318
9 Claims. (Cl. 277—205)

ABSTRACT OF THE DISCLOSURE

A metal seal ring arrangement of particular utility for sealing between two telescoping members. The seal ring has two spaced apart flanges which project from an integral base portion of the ring. The sealing surfaces at the sides of the flanges are spaced apart a distance greater than the base of the ring. Each flange has a thinned portion adjacent the base to enhance the flexibility of the flange so that fluid pressure in the recess between the flanges can readily urge the sealing surfaces of the flanges into engagement with the cooperating surfaces of the telescoping members. The sealing surfaces of the seal ring can be cylindrical or of arcuate radial cross section. A retaining ring fixed to one of the tubular members has an annular axially extending flange which maintains the ring in position adjacent a shoulder on one of the tubular members.

---

This invention relates to devices for sealing against fluid pressure and, more particularly, to the provision of metal-to-metal seals in various types of apparatus for handling fluids under pressure.

In many fields, it is necessary to accomplish a fluid-tight seal between the wall of a passage in an outer member and the surface of a second member disposed within the passage, and prior-art workers have proposed many seal devices for this purpose. In a number of applications, the conditions to which the seal device is subjected require that a metal-to-metal seal be employed, and such devices have been proposed as shown, for example, in U.S. Patents 3,042,248, issued July 3, 1962, to R. E. Kruiger; 3,090,630, issued May 21, 1963, to F. Gasche; and 3,159,302, issued Dec. 1, 1964, to R. E. Latham and J. D. Watts.

Modern practices in the establishment and completion of oil and gas wells, for example, have created a need for a metal-to-metal seal which is fluid-energized and capable of accomplishing the seal at a point, within a cylindrical passage, where the passage does not present a transverse shoulder against which the seal device could be seated. Such a condition frequently exists, for instance, in wellhead installations employing an elongated head member having a cylindrical bore within which a plurality of hanger members are stacked in an upright series, the lowermost hanger member being supported on an internal shoulder provided on the head member. Such a wellhead installation is disclosed, for example, in copending application Ser. No. 302,937, filed Aug. 19, 1963, by R. Bishop and W. W. Word, Jr. Manufacturing tolerances are such that the axial position of an upper one of the series of hanger members cannot be accurately predetermined, and the bore of the head member therefore cannot include a separate supporting shoulder for each hanger member. Hence, designers of such equipment are faced with the problem of sealing between each of the hanger members and a portion of the bore in the head member which is in the form of an uninterrupted right cylindrical surface, and the provision of a fluid-energized metal-to-metal seal device suitable for this purpose has proved exceedingly difficult.

It is accordingly a general object of the invention to provide a fluid-energized metal-to-metal seal device capable of sealing between two concentric members at a point where one such member presents only a simple cylindrical surface to cooperate with the seal device.

Another object is to devise an improved apparatus, such as a wellhead assembly or the like, for handling fluids under pressure and comprising a fluid-energized metal-to-metal seal between two concentric members in an area where one such member presents only a right cylindrical surface cooperating with the seal device.

A further object is to provide an improved metal sealing ring useful in such apparatus.

Yet another object is to devise an improved fluid-energized metal-to-metal seal device including a metal sealing ring engaged with a shoulder on a member to be sealed, and an improved holding element carried by such member and arranged to retain the sealing ring in operative position in such a fashion that energizing pressure fluid will be free to act on the ring.

In order that the manner in which these and other objects are achieved in accordance with the invention can be understood in detail, one advantageous embodiment thereof will be described with reference to the accompanying drawings, which form a part of this specification, and wherein.

Figure 1:
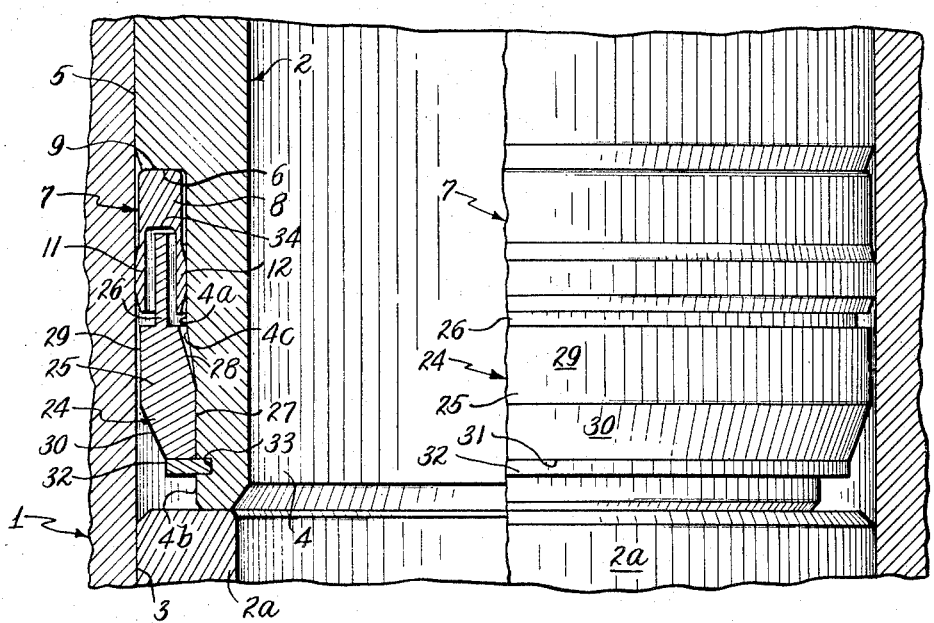
FIG. 1 is a view, partly in vertical section and partly in side elevation, of a portion of a wellhead installation embodying a seal constructed in accordance with the invention.

Turning now to the drawings in detail, the invention is illustrated as practiced in effecting a fluid-tight seal between an outer tubular member 1 and an inner tubular member 2. Typically, member 1 can be a cylindrical housing within which member 2 acts as a piston, or a wellhead member within which member 2 is rigidly supported as a hanger member. Member 1 has a through passage which is defined, at least in the area where the seal is to be accomplished, by a cylindrical wall 3. Member 2 has a tip portion 4 of materially smaller outer diameter than wall 3, a portion 5 of larger outer diameter closely embraced by wall 3, and a transverse annular shoulder 6 at the juncture between portions 4 and 5, the shoulder 6 facing the free end of tip portion 4.

Figure 2:
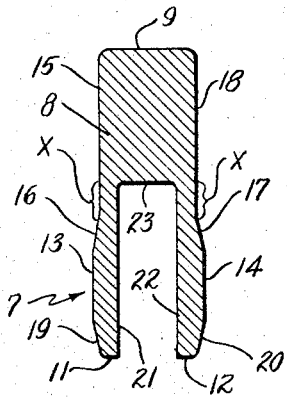
FIG. 2 is a radial cross-sectional view, enlarged with respect to FIG. 1, of a sealing ring employed in the installation of FIG. 1.

The outer surface of tip portion 4 includes a larger diameter cylindrical portion 4a, adjacent shoulder 6, a smaller diameter cylindrical portion 4b and an intermediate frusto-conical portion 4c. Disposed within the annular space between wall 3 and cylindrical surface portion 4a is a metal sealing ring 7 including a circular base portion 8 having one flat end face 9 disposed to engage shoulder 6. Two circular, concentric sealing flanges 11 and 12 are formed integrally with base portion 8 and project from the other end thereof. The larger diameter outer flange 11 has an outer peripheral sealing surface 13, FIG. 2, which is in the form of a right cylindrical surface and, axially of the ring, is substantially shorter than is flange 11. The smaller diameter inner flange 12 has an inner peripheral sealing surface 14 equal in axial length to surface 13 and also in the form of a right cylindrical surface.

Base portion 8 has a generally rectangular radial cross section, the radial thickness of the base portion being significantly less than the radial distance between wall 3 and surface portion 4a. The radial spacing between sealing surfaces 13 and 14, on the other hand, is initially slightly larger than the distance between wall 3 and surface portion 4a so that, when member 2, with ring 7 in place, is inserted within the through passage of member 1, the sealing surfaces 13 and 14 engage wall 3 and surface portion 4a, respectively, with an interference fit. Between sealing surface 13 and the right cylindrical outer surface 15 of base portion 8, flange 11 has a frusto-conical surface portion 16 which tapers toward base portion 8 but terminates short thereof, surface 15 being extended to define a part of flange 11. Similarly, flange 12 has a frusto-conical surface portion 17 which tapers from sealing surface 14 toward the inner right cylindrical surface 18 of base portion 8. At the remaining end of sealing surface 13, flange 11 has a frusto-conical surface portion 19. Flange 12 is similarly provided with a frusto-conical surface portion 20. Surface portions 16 and 17 are complementary, and of identical dimensions. Accordingly, when sealing surfaces 13 and 14 engage wall 3 and surface portion 4a, respectively, the base portion 8 is centered between wall 3 and surface portion 4a.

The inner surface 21 of flange 11 is a right cylindrical surface, as is the outer surface 22 of flange 12, these two surfaces being joined by end face 23 of base portion 8. Since the radial thickness of flanges 11 and 12 is small as compared to the radial space between sealing surfaces 13 and 14, surfaces 21, 22 and 23 cooperate to define a substantial circular space or cavity which opens axially of the sealing ring.

From FIG. 1, it will be noted that base portion 8 and flanges 11 and 12 can all be considered as concentric cylindrical elements with base portion 8 being centered with respect to flanges 11 and 12 and with the common axis for all three elements being coincident with the axis of the inner tubular member 2.

The axial length of ring 7 is slightly shorter than the length of surface portion 4a. Surface portions 4b and 4c are surrounded by a holding ring indicated generally at 24, FIG. 1. The holding ring is an integral metal structure including an annular base portion 25 and an axially projecting cylindrical flange 26. Base portion 25 has an inner peripheral surface 27 slidably embracing surface portion 4b, and a frusto-conical inner surface portion 28 which surrounds surface portion 4c and diverges outwardly therefrom toward flange 26. The outer periphery of base portion 25 includes a right cylindrical surface portion 29 and a frusto-conical surface portion 30 which tapers inwardly toward the transverse annular end face 31 which is opposite flange 26. The radial thickness of base portion 25 is smaller than the radial distance between surface portion 4b and the wall 3 of the through passage of member 1, so that surface portion 29 is spaced inwardly from wall 3.

Flange 26 projects axially into the annular space defined by flanges 11 and 12 and the end face 23 of base portion 8 of the sealing ring. The radial thickness of flange 26 is small as compared to the radial distance between the surfaces 21 and 22 of flanges 11 and 12, so that fluid can flow through the space between surface portion 29 and wall 3 and into the annular space between flanges 11 and 12 when holding ring 24 is in place. The holding ring 24 is retained on member 2 by a split retaining ring 32 engaged in a transverse annular groove 33 near the free end of portion 4. The axial dimensions of ring 24 and base portion 8 of the sealing ring are such that, with ring 32 in place in groove 33, and with the end face 9 of the sealing ring engaging shoulder 6, there is a slight space between end face 34 of flange 26 and the adjacent end face 23 of the base portion 8 of the sealing ring. Accordingly, fluid entering the annular space defined by surfaces 21, 22 and 23 under pressure can fill the entire space and its pressure is applied equally to flanges 11 and 12.

In addition to serving as a retainer to prevent undue axial movement of the sealing ring 7 away from shoulder 6, ring 24 can be employed as a means for forcing the sealing ring over portion 4 of member 2. In this regard, the interference fit between flange 12 and member 2 is such that a considerable axial force is applied to the sealing ring to force the same over cylindrical surface portion 4a. Since flange 26 of ring 24 can engage face 23, such an axial force can be applied via ring 24 directly to base portion 8, so that no damage to the flanges 11 and 12 will occur.

Alternatively, ring 24 can be eliminated, and the distance between shoulder 6 and groove 33 can be shortened so that ring 32 cooperates directly with the free end of flange 12. In such cases, the sealing ring can be applied to member 2 by means of a suitable cylindrical tool (not shown) which is used in direct contact with the end face 23 of base portion 8 of ring 7. With ring 24 omitted, the dimensions of ring 33 are made such that ring 33 does not block entry of fluid into the space defined by surfaces 21, 22 and 23.

The sealing ring 7 is fabricated from a metal of such character that the flanges 11 and 12 are elastically deformable under the fluid pressures to be encountered in the particular application involved. Typically, the sealing ring can be made from stainless steel or 10–40 medium carbon steel. In this connection, in typical applications for seal devices in accordance with the invention, the fluid entering the space between end portion 4 of member 2 and wall 3 can be on the order of 15,000 lbs. per sq. in., a value markedly higher than could be handled were the sealing engagements of surfaces 13 and 14 with surfaces 3 and 4a, respectively, maintained only by an interference fit. The ability of the seal devices of the invention to handle such fluid pressures effectively arises from the fact that the flanges 11 and 12 are elastically deformed outwardly and inwardly, respectively, to maintain effective sealing engagements between surface 13 and wall 3, and between surface 14 and surface portion 4a.

It will be noted that the portions of flanges 11 and 12 immediately adjacent base portion 8 are thinner, by reason of frusto-conical surface portions 16 and 17 with the extensions of the outer and inner surfaces of base portion 8. Hence, there is a substantially greater opportunity for elastic deformation of flanges 11 and 12 in the areas indicated at X in FIG. 2 than in the thicker areas defined by sealing surfaces 13 and 14. Accordingly, with sealing surfaces 13 and 14 engaging surfaces 3 and 4a, respectively, pressure fluid passing upwardly around holding ring 24 and entering the cavity between flanges 11 and 12 will cause the sealing flanges to be elastically deformed away from each other, with the deformation occurring mainly in portions X of the flanges, so that the sealing surfaces 13 and 14 are forced against surfaces 3 and 4a, respectively, yet substantially retain their concentric right cylindrical disposition rather than becoming divergent.

Since the combination of holding ring 24 and sealing ring 7 is positively retained on member 2 by shoulder 6 and retaining ring 32, and since sealing surface 13 is smooth and cylindrical, member 2 can be readily inserted into and removed from the passage of member 1, and an effective seal is established without regard to the precise axial position of member 2 in the passage, so long as surface 13 engages wall 3.

Figure 3:
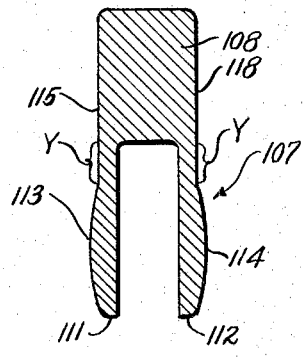
FIG. 3 is a cross-sectional view, similar to FIG. 2, of a modified form of sealing ring in accordance with the invention.

A modified form of sealing ring in accordance with the invention is shown in FIG. 3. Here, the sealing ring 107 is of generally the same configuration as ring 7, FIGS. 1 and 2, and comprises a base portion 108 and sealing flanges 111 and 112. The outer and inner surfaces 115 and 118 of the base portion of the ring are again extended axially to define portions of the outer and inner surfaces of flanges 111 and 112, respectively. The remainder of the outer surface of flange 111 is in the form of a surface portion 113 which extends circularly about the central axis of the ring and is of arcuate radial cross section. Similarly, flange 112 is completed by an annular surface portion 114 which is of arcuate radial cross section. The radial cross section of surface portion 113 is convex when viewed from outside the sealing ring, and that of surface portion 114 is convex when viewed from the center of the ring. Since surface portions 113 and 114 are axially shorter than flanges 111 and 112 and commence at the free edges of the flanges, the portions Y of the flanges adjacent base portion 108 are radially thinner than the main bodies of the flanges, so that, when pressure fluid acts within the annular cavity between flanges 111 and 112, and the flanges are elastically deformed outwardly and inwardly, respectively, most of the deformation occurs in portions Y. The radially arcuate surface portions 113 and 114 constitute the sealing surfaces and, when employed in a structure such as that seen in FIG. 1, are in line contact with surfaces 3 and 4a, respectively.

Returning to FIG. 1, the inner member 2 can be in simple axial engagement with a second such member 2a, and it will be clear that the effectiveness of the seal established by the sealing ring is not dependent upon the precise axial positions of members 2 and 2a within the passage defined by wall 3.

Though advantageous embodiments of the invention have been chosen for illustrative purposes, it will be understood by those skilled in the art that various changes and modifications can be made therein without departing from the scope of the invention as defined in the appended claims.

What is claimed is:

1. A metal sealing ring for establishing a fluid-tight seal between two telescopically engaged cylindrical members, comprising
    an annular base portion having an end face for axial engagement with an annular shoulder on one of the telescopically engaged cylindrical members, and
    two concentric radially spaced annular sealing flanges integrally joined to said base portion at the other end thereof and projecting axially away from said other end,
        the larger of said flanges having an outer peripheral sealing surface, and the smaller of said flanges having an inner peripheral sealing surface,
        the radial spacing between said sealing surfaces being greater than the radial thickness of said base portion, and said base portion being centered between said sealing surfaces,
        the radial thickness of each of said flanges being small as compared to the radial thickness of said base portion, whereby an axially opening annular space is provided between said flanges, and said other end of said base portion presents an axially exposed end face of substantial radial extent which joins the adjacent ends of said flanges,
        each of said flanges being radially thinner, and therefore more easily flexed, adjacent said base portion than in intermediate areas spaced from said base portion whereby fluid pressure applied in said axially opening annular space can urge said flanges radially away from each other to force said sealing surfaces respectively against cooperating surfaces presented by the telescopically engaged cylindrical members.

2. A sealing ring according to claim 1, wherein said sealing surfaces are right cylindrical surfaces substantially shorter than said flanges, and
    each of said flanges includes a frusto-conical surface portion, said frusto-conical surface portions converging from said sealing surfaces toward said base portion.

3. A sealing ring according to claim 2, wherein the inner surface of said larger flange and the outer surface of said smaller flange are right cylindrical surfaces.

4. In apparatus for handling fluid under pressure, the combination of
    a first tubular member having a through passage defined at least in part by a cylindrical wall;
    a second member having a cylindrical portion disposed in said passage,
        one of said first and second members having a transverse annular shoulder,
        said cylindrical wall and said cylindrical portion of said second member being concentric and spaced apart by a predetermined radial distance, and said shoulder being directed toward the annular space between said cylindrical wall and said cylindrical portion of said second member;
    a metal sealing ring encircling said cylindrical portion of said second member within said annular space and including
        an annular base portion having an end face disposed to engage said shoulder, said base portion having a radial thickness smaller than said predetermined radial distance, and
        two concentric radially spaced annular sealing flanges integrally joined to said base and projecting axially therefrom into said annular space, the outer one of said flanges having an outer peripheral sealing surface engaging said cylindrical wall of said first member, the inner one of said flanges having an inner peripheral sealing surfaces engaging said cylindrical portion of said second member,
        the radial thickness of each of said flanges being small as compared to the radial distance between said cylindrical wall of said first member and said cylindrical portion of said second member, whereby an axially opening circular space is provided between said flanges, said circular space being closed at one end by said base portion and having its other end in communication with said annular space between said cylindrical wall and said cylindrical portion of said second member,
        each of said flanges being radially thinner adjacent said base portion than in intermediate areas spaced from said base portion, whereby fluid pressure communicated to said circular space from within said through passage can cause said flanges to flex away from each other to urge said sealing surfaces against said cylindrical wall of said first member and said cylindrical portion of said second member; and
    a positioning ring carried by one of said first member and said second member to position said sealing ring adjacent said shoulder.

5. Apparatus according to claim 4, wherein said positioning ring includes a circular flange projecting into said circular space to engage said base portion.

6. Apparatus according to claim 5, wherein said positioning ring includes a main body portion embracing said cylindrical portion of said second member and having a radial thickness less than the radial distance between said cylindrical wall of said first member and said cylindrical portion of said second member,
    said circular flange of said positioning ring having a radial thickness materially smaller than the radial space between said sealing flanges.

7. In a device of the type described, the combination of a rigid tubular member having
        a first cylindrical portion of larger outer diameter,
        a second cylindrical portion of smaller diameter, and a transverse annular shoulder joining said first and second portions;

a metal sealing ring comprising
  a circular base portion encircling said second cylindrical portion of said tubular member and having a transverse annular first end face directed toward said shoulder, and
  inner and outer concentric circular sealing flanges integral with said base portion and projecting axially from the end of said base portion opposite said first end face, said inner flange having an inner peripheral sealing surface engaging said second cylindrical portion of said tubular member, said outer flange having an outer peripheral sealing surface for sealing engagement with the cylindrical wall of a passage into which said tubular member is to be inserted, the radial space between said sealing surfaces being greater than the radial thickness of said base portion and said base portion being coaxial with said sealing surfaces and centered therebetween, the thickness of said flanges being small as compared to the radial space between said sealing surfaces, and the combination of said flanges and said base portion defining an annular space which opens axially away from said base portion; and a holding ring encircling said tubular member on the side of said sealing ring opposite said shoulder and being fixed on said tubular member against movement axially away from said sealing ring, said holding ring including
  a circular flange projecting axially into said annular space and engaging said base portion of said sealing ring to maintain said base portion at said shoulder, and
  a base portion having an inner peripheral surface embracing said tubular member, said base portion of said holding ring having an outer peripheral surface spaced concentrically inwardly from said outer peripheral sealing surface of said outer flange,
  said holding ring being dimensioned to allow flow of fluid under pressure into said annular space when said tubular member is disposed within a fluid-handling passage.

8. A device according to claim 7, wherein
said inner peripheral sealing surface of said inner flange is of arcuate radial cross section; and
said outer peripheral sealing surface of said outer flange is of arcuate radial cross section.

9. Apparatus for handling fluid under pressure according to claim 4 wherein
the distance between the outer peripheral sealing surface of said outer flange and the inner peripheral sealing surface of said inner flange is initially greater than said predetermined radial distance,
whereby, said sealing surface tightly engage said cylindrical wall and said cylindrical portion.

References Cited

UNITED STATES PATENTS

| | | | |
|---|---|---|---|
| 954,195 | 4/1910 | Law | 227—205 |
| 1,583,931 | 5/1926 | Joyce | 227—205 |
| 1,755,436 | 4/1930 | Faudi | 227—205 |
| 1,861,916 | 6/1932 | Hennebohle | 277—205 |
| 2,521,692 | 9/1950 | Costello | 227—205 |
| 2,998,288 | 8/1961 | Newhouse | 277—205 |

FOREIGN PATENTS 441,857  11/1948  Italy.

LAVERNE D. GEIGER, *Primary Examiner.*

D. MASSENBERG, *Assistant Examiner.*